(12) United States Patent
Lee et al.

(10) Patent No.: US 11,462,821 B2
(45) Date of Patent: Oct. 4, 2022

(54) ELECTRONIC DEVICE WITH A PLURALITY OF ANTENNA CIRCUITRIES AND A METHOD FOR CONTROLLING THE SAME

(71) Applicant: SAMSUNG ELECTRONICS CO., LTD., Suwon-si (KR)

(72) Inventors: Hanyeop Lee, Suwon-si (KR); Hyosung Lee, Suwon-si (KR); Namjun Cho, Suwon-si (KR); Donghyun Kim, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/209,499

(22) Filed: Mar. 23, 2021

(65) Prior Publication Data
US 2021/0296761 A1 Sep. 23, 2021

(30) Foreign Application Priority Data
Mar. 23, 2020 (KR) .................. 10-2020-0035100

(51) Int. Cl.
| H01Q 1/24 | (2006.01) |
| H04B 1/04 | (2006.01) |
| H04B 1/18 | (2006.01) |

(52) U.S. Cl.
CPC .............. *H01Q 1/247* (2013.01); *H04B 1/04* (2013.01); *H04B 1/18* (2013.01); *H04B 2001/045* (2013.01); *H04B 2001/0491* (2013.01)

(58) Field of Classification Search
CPC . H01Q 1/247; H04B 1/04; H04B 1/18; H04B 2001/045; H04B 2001/0491
See application file for complete search history.

(56) References Cited

U.S. PATENT DOCUMENTS

| 8,350,764 B2 | 1/2013 | Rao et al. |
| 8,634,782 B2 | 1/2014 | Asuri et al. |
| (Continued) | | |

FOREIGN PATENT DOCUMENTS

| JP | 2003-037541 | 2/2003 |
| KR | 10-2019-0089955 | 7/2019 |

OTHER PUBLICATIONS

International Search Report and Written Opinion dated Jun. 29, 2021 in corresponding International Application No. PCT/KR2021/003605.

*Primary Examiner* — Nguyen T Vo
(74) *Attorney, Agent, or Firm* — Nixon & Vanderhye P.C.

(57) ABSTRACT

According to various embodiments of the disclosure, a portable communication device may include: a processor, a communication circuit, at least one first type antenna circuitry, and at least one second type antenna circuitry, wherein the at least one first type antenna circuitry may include an antenna array configured to transmit and/or receive a signal, a power amplifier configured to amplify a transmit signal and a low noise amplifier configured to amplify a received signal, the at least one second type antenna circuitry may include an antenna array configured to receive a signal and a low noise amplifier configured to amplify a received signal, the at least one second type antenna circuitry not including a power amplifier for amplifying a transmit signal, wherein the processor may be configured to control the portable communication device to transmit a transmit signal through the at least one first type antenna circuitry, and to receive a receive signal through at least one selected from the at least one first type antenna circuitry and the at least one second type antenna circuitry.

20 Claims, 23 Drawing Sheets

(56) References Cited

U.S. PATENT DOCUMENTS

| | | | |
|---|---|---|---|
| 8,725,085 B2 | 5/2014 | Darabi et al. | |
| 9,300,055 B2 | 3/2016 | Tseng et al. | |
| 9,438,319 B2 | 9/2016 | Greene | |
| 2006/0178111 A1* | 8/2006 | Choi | H04B 1/525 |
| | | | 455/295 |
| 2007/0105505 A1* | 5/2007 | Crocker | H04B 1/18 |
| | | | 455/562.1 |
| 2011/0300914 A1* | 12/2011 | Gudem | H04B 1/1027 |
| | | | 455/574 |
| 2013/0154894 A1 | 6/2013 | Caimi et al. | |
| 2019/0363453 A1* | 11/2019 | Yu | H04B 7/0413 |
| 2019/0377075 A1* | 12/2019 | Tsfati | H04B 17/27 |
| 2020/0091608 A1 | 3/2020 | Alpman et al. | |
| 2020/0403672 A1* | 12/2020 | Pajona | H04B 7/0617 |
| 2020/0412425 A1* | 12/2020 | Laghate | H04B 7/0874 |
| 2021/0068077 A1* | 3/2021 | Raghavan | H04B 7/0608 |
| 2021/0409973 A1* | 12/2021 | Berggren | H04W 24/02 |

* cited by examiner

ELECTRONIC DEVICE WITH A PLURALITY OF ANTENNA CIRCUITRIES AND A METHOD FOR CONTROLLING THE SAME

CROSS-REFERENCE TO RELATED APPLICATION

This application is based on and claims priority under 35 U.S.C. § 119 to Korean Patent Application No. 10-2020-0035100, filed on Mar. 23, 2020, in the Korean Intellectual Property Office, the disclosure of which is incorporated by reference herein in its entirety.

BACKGROUND

Field

The disclosure relates to an electronic device including a plurality of antenna circuitries for supporting a high frequency band.

Description of Related Art

To satisfy a wireless data traffic demand which is growing after a 4th generation (4G) communication system is commercialized, efforts are exerted to develop an advanced (e.g., 5th-generation (5G) or pre-5G) communication system. For example, the 5G communication system or the pre-5G communication system which may be referred to as a beyond 4G network communication system or a post long term evolution (LTE) system.

To achieve a high data rate, the advanced communication system may be realized in a high frequency band. To mitigate a path loss of propagation and to extend a propagation distance in the high frequency band, the advanced communication system discussing beamforming, massive multi-input multi-output (MIMO), full dimensional (FD)-MIMO, array antenna, analog beam-forming, and large scale antenna techniques is being explored.

Also, for network enhancement of the system, the advanced communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

The advanced system is working on hybrid frequency shift keying and quadrature amplitude modulation (FQAM) and sliding window superposition coding (SWSC) which are advanced coding modulation (ACM) schemes, and filter bank multi carrier (FBMC), non orthogonal multiple access (NOMA), and sparse code multiple access (SCMA) which are advanced access technologies.

A high frequency band signal (e.g., 3 GHz-100 GHz), which has a short wavelength and strong straightness, may be subject to relatively greater attenuation than a low frequency band signal, in transmission through a free space.

As a configuration such as a power amplifier (PA) in a transmission circuit connected with an array antenna of an antenna circuitry increases, a size of the antenna circuitry may increase. In addition, a process for manufacturing the configuration in the antenna circuitry may cause considerable power consumption and huge heat.

SUMMARY

Various embodiments of the disclosure may provide an antenna circuitry for supporting wireless communication in a high frequency band and reducing power consumption with a small size, and an operating method therefor.

Various embodiments of the disclosure may provide a frontend structure for securing a space by reducing the number of transmission circuits in the frontend structure of an antenna circuitry.

According to various example embodiments of the disclosure, a portable communication device may include: a processor, a communication circuit, at least one first type antenna circuitry, and at least one second type antenna circuitry, wherein the at least one first type antenna circuitry may include an antenna array configured to transmit and/or receive a signal, a power amplifier configured to amplify a transmit signal and a low noise amplifier configured to amplify a received signal, the at least one second type antenna circuitry may include an antenna array configured to receive a signal and a low noise amplifier configured to amplify a received signal, the at least one second type antenna circuitry not including a power amplifier for amplifying a transmit signal, wherein the processor may be configured to control the portable communication device to transmit a transmit signal through the at least one first type antenna circuitry, and to receive a received signal through at least one selected from the at least one first type antenna circuitry and the at least one second type antenna circuitry.

According to various example embodiments of the disclosure, a of controlling a portable communication device which includes at least one first type antenna circuitry and at least one second type antenna circuitry, the at least one first type antenna circuitry including an antenna array configured to transmit and/or receive a signal, a power amplifier configured to amplify a transmit signal and a low noise amplifier configured to amplify a received signal, the at least one second type antenna circuitry including an antenna array configured to receive a signal and a low noise amplifier configured to amplify a received signal, the at least one second type antenna circuitry not including a power amplifier for amplifying a transmit signal, may include: transmitting a transmit signal through the at least one first type antenna circuitry, and receiving a received signal through at least one selected from the at least one first type antenna circuitry and the at least one second type antenna circuitry.

According to various example embodiments of the disclosure, a portable communication device may include: a processor, a communication circuit, at least one first type antenna circuitry, and at least one second type antenna circuitry, wherein the at least one first type antenna circuitry may include an antenna array configured to transmit and/or receive a signal, a power amplifier configured to amplify a transmit signal and a low noise amplifier configured to amplify a received signal, the at least one second type antenna circuitry may include an antenna array configured to receive a signal and a low noise amplifier configured to amplify a received signal, the at least one second type antenna circuitry not including a power amplifier for amplifying a transmit signal, wherein the processor may be configured to control the portable communication device to transmit a transmit signal through the at least one first type antenna circuitry, and, based on a level of a receive signal received through the first type antenna circuitry being below a threshold, to receive a receive signal through the at least one first type antenna circuitry and the at least one second type antenna circuitry by searching for a receive beam.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Hereinafter, various example embodiments are described in greater detail with reference to the accompanying drawings.

Figure 1:
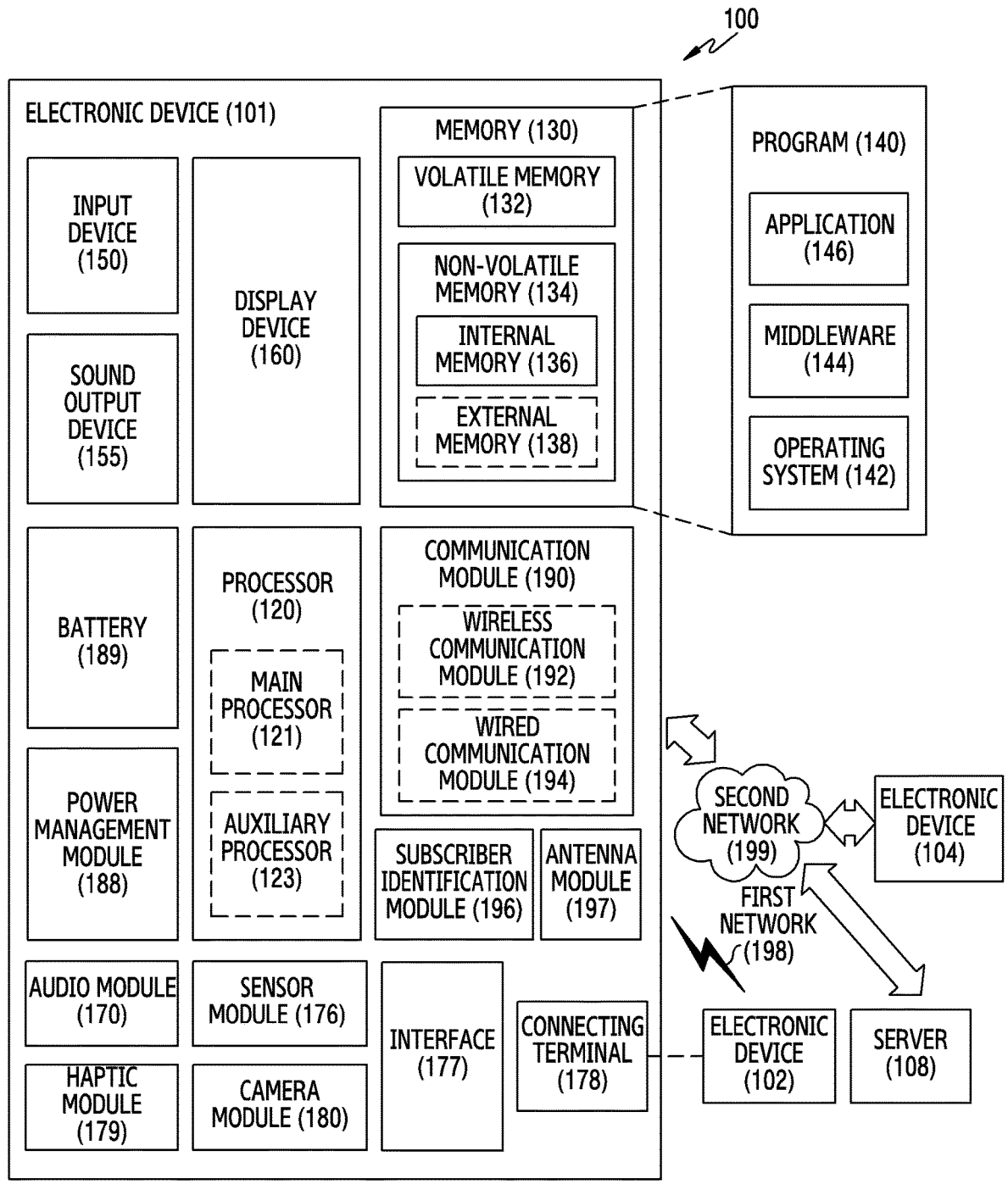
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146. The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
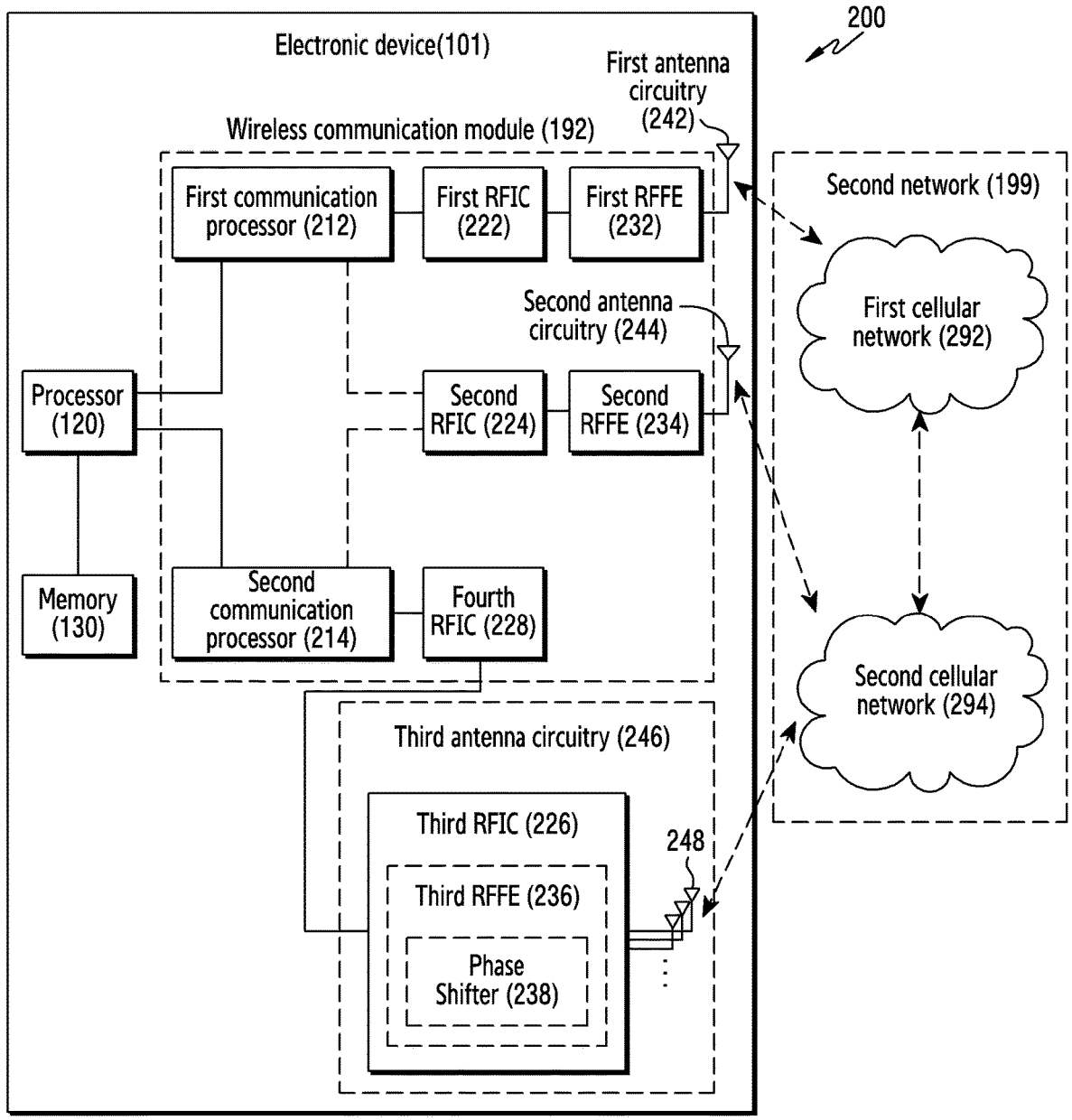
FIG. 2 is a block diagram illustrating an example communication module for supporting communication with a plurality of wireless networks in an electronic device according to various embodiments.

FIG. 2 is a block diagram illustrating an example communication module 200 for supporting communication with a plurality of wireless networks in an electronic device 101 according to various embodiments.

Referring to FIG. 2, the electronic device 101 may include a first communication processor (CP) (e.g., including processing circuitry) 212, a second CP (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna circuitry 242, a second antenna circuitry 244, and antenna elements 248. The electronic device 101 may further include a processor (e.g., including processing circuitry) 120 and a memory 130. The second network 199 may include a first cellular network 292 and a second cellular network 294. According to an embodiment, the electronic device 101 may further include at least one of the components described in FIG. 1, and the second network 199 may include at least one other network. According to an embodiment, the first CP 212, the second CP 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted, or may be included as part of the third RFIC 226.

The first CP 212 may include various processing circuitry and establish a communication channel of a band to be used for the wireless communication with the first cellular network 292, and support legacy network communication over the established communication channel According to various embodiments, the first cellular network 292 may be a legacy network including a 2nd generation (2G), 3rd generation (3G), or 4G or LTE network. The second CP 214 may include various processing circuitry and establish a communication channel corresponding to a designated band (e.g., about 6 GHz~about 60 GHz) in the band to be used for radio communication with the second network 294, and support 5G network communication over the established communication channel According to various embodiments, the second cellular network 294 may be a 5G network defined in 3rd generation partnership project (3GPP). Additionally, according to an embodiment, the first CP 212 or the second CP 214 may establish a communication channel corresponding to other designated band (e.g., below about 6 GHz) of the band to be used for the radio communication with the second network 249, and support the 5G network communication over the established communication channel According to an embodiment, the first CP 212 and the second CP 214 may be implemented in a single chip or in a single package. According to various embodiments, the first CP 212 or the second CP 214 may be formed in a single chip or a single package with the processor 120, the auxiliary processor 123, or the communication module 190. According to an embodiment, the first CP 212 and the second CP 214 may be interconnected directly or indirectly by an interface (not shown), to provide or receive data or a control signal in any one direction or both directions.

The first RFIC 222 may, in transmission, convert a baseband signal (BB) generated by the first CP 212 to a radio frequency (RF) signal of about 700 MHz through about 3 GHz used for the first cellular network 292 (e.g., the legacy network). In reception, an RF signal may be obtained from the first cellular network 292 (e.g., the legacy network) via an antenna (e.g., the first antenna circuitry 242), and preprocessed through an RFFE (e.g., the first RFFE 232). The first RFIC 222 may convert the preprocessed RF signal to a BB signal to be processed by the first CP 212.

The second RFIC 224 may, in transmission, convert the BB signal generated by the first CP 212 or the second CP 214 to an RF signal (hereinafter, a 5G Sub6 RF signal) of a Sub6 band (e.g., below about 6 GHz) used in the second network 294 (e.g., the 5G network). In reception, a 5G Sub6 RF signal may be obtained from the second cellular network 294 (e.g., the 5G network) via an antenna (e.g., the second antenna circuitry 244), and preprocessed through an RFFE (e.g., the second RFFE 234). The second RFIC 224 may convert the preprocessed 5G Sub6 RF signal to a BB signal to be processed by a corresponding communication processor of the first CP 212 or the second CP 214.

In transmission, the third RFIC 226 may convert the BB signal generated by the second CP 214 to an RF signal (hereinafter, a 5G Above6 RF signal) of a 5G Above6 band (e.g., about 6 GHz through about 60 GHz) to be used in the second cellular network 294 (e.g., the 5G network). In reception, the third RFIC 226 may preprocess a 5G Above6 RF signal obtained from the second cellular network 294 (e.g., the 5G network) through antenna elements (e.g., the antenna elements 248), and convert the preprocessed 5G Above6 RF signal to a BB signal to be processed by the second CP 214. According to an embodiment, the third RFFE 236 may be formed as part of the third RFIC 226.

According to an embodiment, the electronic device 101 may include the fourth RFIC 228, separately from or or as at least part of the third RFIC 226. In this case, the fourth RFIC 228 may convert the BB signal generated by the second CP 214 to an RF signal (hereinafter, an intermediate frequency (IF) signal) of an IF band (e.g., about 9 GHz through about 11 GHz), and forward the IF signal to the third RFIC 226. The third RFIC 226 may convert the IF signal to a 5G Above6 RF signal. In reception, a 5G Above6 RF signal may be received from the second cellular network 294 (e.g., the 5G network) via antenna elements (e.g., the antenna elements 248), and converted to an IF signal by the third RFIC 226. The fourth RFIC 228 may convert the IF signal to a BB signal to be processed by the second CP 214.

According to an embodiment, the first RFIC 222 and the second RFIC 224 may be implemented at least part of a single chip or a single package. According to an embodiment, the first RFFE 232 and the second RFFE 234 may be implemented as at least part of a single chip or a single package. According to an embodiment, at least one of the first antenna circuitry 242 or the second antenna circuitry 244 may be omitted or combined with other antenna circuitry to process RF signals of a plurality of corresponding bands.

According to an embodiment, the third RFIC 226 and the antenna elements 248 may be disposed on the same substrate to form the third antenna circuitry 246. For example, the wireless communication module 192 or the processor 120 may be disposed on a first substrate (e.g., a main PCB, a first PCB). In this case, the third RFIC 226 may be disposed in some area (e.g., a bottom surface) of a second substrate (e.g., a sub PCB a second PCB) which is separated from the first substrate, and the antenna elements 248 may be disposed in other some area (e.g., a top surface), to form the third antenna circuitry 246. By disposing the third RFIC 226 and the antenna elements 248 on the same substrate, it may be possible to reduce a length of a transmission line between them. This may, for example, reduce loss (attenuation) of the signal of the high frequency band (e.g., about 6 GHz through about 60 GHz) used in the 5G network communication due to the transmission line. Hence, the electronic device 101 may improve a quality or a speed of the communication with the second cellular network 294 (e.g., the 5G network).

According to an embodiment, the third RFFE 236 may be separated from the third RFIC 226 and configured as a separate chip. For example, the third antenna circuitry 246 may include the third RFFE 236 and the antenna elements 248 on the second substrate. For example, the third RFIC 226 from which the third RFFE 236 is separated, may or may not be disposed on the second substrate.

According to an embodiment, the antenna elements 248 may be formed as an antenna array including a plurality of antenna elements which may be used for beamforming. In this case, the third RFIC 226 may include, as part of the third RFFE 236, a plurality of phase shifters 238 corresponding to the plurality of the antenna elements. In transmission, the plurality of the phase shifters 238 each may shift a phase of a 5G Above6 RF signal to be transmitted to outside (e.g., a 5G network base station) of the electronic device 101 via a corresponding antenna element. In reception, the plurality of the phase shifters 238 each may shift a phase of a 5G Above6 RF signal received from the outside via a corresponding antenna element to an identical or substantially identical phase. This enables the transmission or the reception through the beamforming between the electronic device 101 and the outside.

According to an embodiment, the third antenna circuitry 246 may up-convert the 1313 transmit signal provided by the second CP 214. The third antenna circuitry 246 may transmit the RF transmit signal generated by the up-conversion, through at least two transmit and receive antenna elements of the antenna elements 248. The third antenna circuitry 246 may receive an RF receive signal through at least two transmit and receive antenna elements and at least two receive antenna elements of the antenna elements 248. The third antenna circuitry 246 may generate a BB receive signal by down-converting the RF receive signal. The third antenna circuitry 246 may output the BB receive signal generated by the down-conversion to the second CP 214. The third antenna circuitry 246 may include at least two transmit and receive circuits corresponding one-to-one to at least two transmit and receive antenna elements and at least two receive circuits corresponding one-to-one to at least two receive antenna elements.

The second cellular network 294 (e.g., the 5G network) may be operated independently of (e.g., stand-alone (SA)) or in association with (e.g., non-stand alone (NSA)) the first cellular network 292 (e.g., the legacy network). For example, the 5G network may include only an access network (e.g., a 5G radio access network (RAN) or a next generation RAN (NG RAN)), without a core network (e.g., a next generation core (NGC)). In this case, the electronic device 101 may access the access network of the 5G RAN, and then access an external network (e.g., Internet) under control of a core network (e.g., evolved packet core (EPC)) of a legacy system. Protocol information (e.g., LTE protocol information) for the communication with the legacy network and protocol information (e.g., New Radio (NR) protocol information) for the communication with the 5 network may be stored in the memory 230, and accessed by other component (e.g., the processor 220, the first CP 212, or the second CP 214).

According to various embodiments, the processor 120 of the electronic device 101 may include various processing circuitry and execute one or more instructions stored in the memory 130. The processor 120 may include a circuit for processing data, for example, at least one of an integrated circuit (IC), an arithmetic logic unit (ALU), a field programmable gate array (FPGA), and large scale integration (LSI). The memory 130 may store data related to the electronic device 101. The memory 130 may include a volatile memory such as a random access memory (RAM) including a static random access memory (SRAM) or a dynamic RAM (DRAM), or may include include a nonvolatile memory such as a flash memory, an embedded multimedia card (eMMC), a solid state drive (SSD) as well as a read only memory (ROM), a magneto-resistive RAM (MRAM), a spin-transfer torque MRAM (STT-MRAM), a phase-change RAM (PRAM), a resistive RAM (RRAM), or a ferroelectric RAM (FeRAM).

According to various embodiments, the memory 130 may store instructions related to an application and instructions related to an operating system (OS). The OS is system software executed by the processor 120. The processor 120 may manage hardware components included in the electronic device 101, by executing the OS. The OS may provide an application programming interface (API) as an application which is the remaining software except for system software.

According to various embodiments, one or more applications which are a set of applications may be installed in the memory 130. If the application is installed in the memory 130, the application is stored in a format executable by the processor 120 connected to the memory 130.

Figure 3:
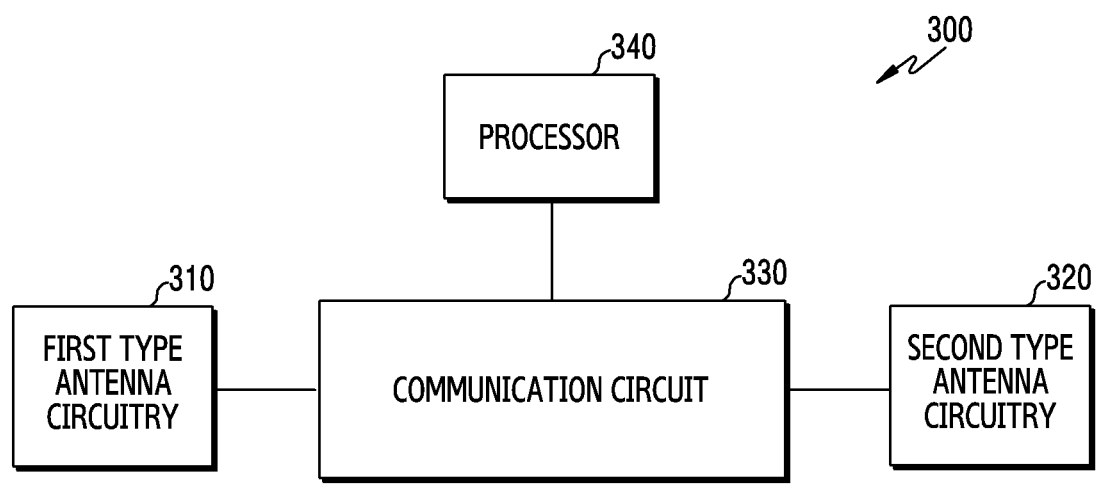
FIG. 3 is a block diagram illustrating an example configuration of a portable communication device according to various embodiments.

FIG. 3 is a block diagram illustrating an example configuration of a portable communication device 300 according to various embodiments. The portable communication device 300 of FIG. 3 may include the electronic device 101 of FIG. 1 or FIG. 2.

Referring to FIG. 3, the portable communication device 300 according to an embodiment may include a processor (e.g., including processing circuitry) 340 (e.g., the processor 120 of FIG. 1), a communication circuit 330 (e.g., the wireless communication module 192 of FIG. 1), at least one first type antenna circuitry 310 and/or at least one second type antenna circuitry 320. For example, the at least one first type antenna circuitry 310 may include an antenna circuitry (e.g., the third antenna circuitry 246 of FIG. 2). For example, the second type antenna circuitry 320 may be formed differently in part from the first type antenna circuitry 310.

According to an embodiment, the communication circuit 330 may be electrically coupled with the processor 340 (e.g., a main processor, an application processor or a communication processor), the at least one first type antenna circuitry 310 and the at least one second type antenna circuitry 320 for transmission and/or reception of a radio signal. For example, the communication circuit 330 may be disposed in one chip package or throughout a plurality of chip packages. For example, the communication circuit 330 may include at least one of an IFIC (intermediate frequency integrate circuit), a combiner, a divider, a phase shifter, a phased locked loop (PLL), or a mixer. For example, the communication circuit 330 may be disposed in one chip package. In an embodiment, the communication circuit 330 may be implemented with an IFIC.

According to an embodiment, the at least one first type antenna circuitry 310 may include a transmission and reception circuit and antenna elements (e.g., the antenna elements 248 of FIG. 2). For example, the second type antenna circuitry 320 may include a reception circuit and antenna elements (e.g., the antenna elements 248 of FIG. 2).

According to an embodiment, the at least one first type antenna circuitry 310 and the at least one second type antenna circuitry 320 in the electronic device 101 may be disposed to face different directions respectively.

According to an embodiment, the at least one first type antenna circuitry 310 may up-convert a transmit signal fed from the communication circuit 330 to an RF signal, amplify and transmit the RF signal, and receive and down-convert an RF signal over a downlink.

According to an embodiment, the at least one second type antenna circuitry 320 may receive and down-convert an RF signal over a downlink.

According to an embodiment, if the communication circuit 330 is the IFIC, the communication circuit 330 may convert the transmit signal fed from the processor 340 to an IF signal, and provide the IF signal to the at least one first type antenna circuitry 310. If the communication circuit 330 is the IFIC, the communication circuit 330 may convert the IF signal fed from the at least one first type antenna circuitry 310 or the at least one second type antenna circuitry 320 to a receive signal, and provide the converted receive signal to the processor 340.

According to various embodiments, since a signal of a high frequency band of about 15 GHz through 100 GHz is subject to considerable attenuation not only in a free space but also through a PCB wire, the communication circuit 330 may receive the signal from the first type antenna circuitry 310 or the second type antenna circuitry 320 or transmit the signal to the first type antenna circuitry 310 over the IF band which is relatively lower than the RF signal. The IF band may be, for example, about 7-13 GHz (e.g., 11 GHz).

According to various embodiments, the electronic device 101 may include the first type antenna circuitry 310 of various numbers or the second type antenna circuitry 320 of various numbers. For example, the first type antenna circuitry 310 or the second type antenna circuitry 320 may include antenna circuitries of an adequate number by considering the communication functionality of the electronic device 101, efficiency, or the mounting position. For example, the number of the first type antenna circuitry 310 or the second type antenna circuitry 320 required for the transmission and the reception may be determined depending on spatial conditions for deploying the first type antenna circuitry 310 or the second type antenna circuitry 320 according to a size and a structure of the electronic device 101, a communication environment and performance of the first type antenna circuitry 310 or the second type antenna circuitry 320.

Figure 4:
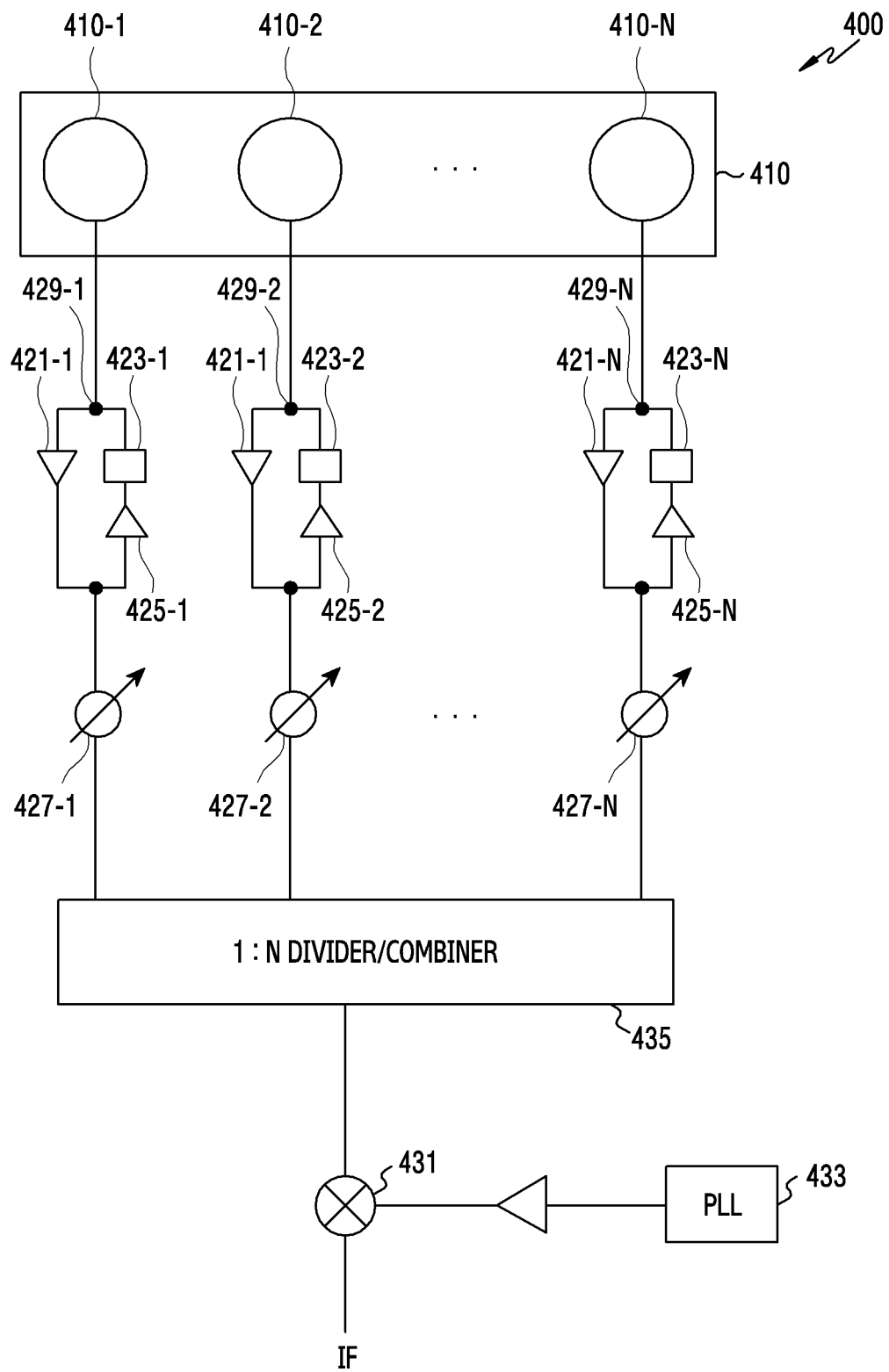
FIG. 4 is a diagram illustrating an example first type antenna circuitry in an electronic device according to various embodiments.

FIG. 4 is a diagram illustrating an example structure of a first type antenna circuitry 400 (e.g., the at least one first type antenna circuitry 310 of FIG. 3) in an electronic device 101 according to various embodiments.

According to a non-limiting example embodiment, the first type antenna circuitry 400 may be implemented as an independent circuitry by mounting components on one circuit board.

According to an embodiment, the first type antenna circuitry 400 may include an antenna array 410 including a plurality of antenna elements 410-1, 410-2 through 410-N, power amplifiers (PAs) 425-1, 425-2 through 425-N for amplifying a transmit signal, power detectors 423-1, 423-2 through 423-N, low noise amplifiers (LNAs) 421-1, 421-2 through 421-N, phase shifters 427-1, 427-2 through 427-N, and/or Tx/Rx switches 429-1, 429-2 through 429-N for selectively connecting a transmit or a receive path of the power detectors 423-1, 423-2 through 423-N or the LNAs 421-1, 421-2 through 421-N and the plurality of the antenna elements 410-1, 410-2 through 410-N. The plurality of the antenna elements 410-1, 410-2 through 410-N may enable both of the signal transmission and the signal reception.

According to an embodiment, to transmit and receive a signal of the high frequency band (e.g., about 15 GHz-100 GHz) in the electronic device (e.g., the electronic device 101 of FIG. 1), the first type antenna circuitry 400 may include an RFIC (e.g., the third RFIC 226 of FIG. 2) including a mixer 431 and/or a PLL 433. For example, the first type antenna circuitry 400 may convert an IF band signal to an RF signal of about 15 GHz-100 GHz or convert an RF signal of about 15 GHz-100 GHz to an IF signal, using the mixer 431 and the PLL 433. The PLL 433 may generate a reference signal for the up-converting/down-converting. The mixer 431 may mix the transmit IF signal with the reference signal and thus output the up-converted RF signal. The mixer 431 may mix the received RF signal and the reference signal and thus output the down-converted IF signal.

According to an embodiment, a Tx/Rx switch (e.g., the Tx/Rx switches 429-1 through 429-N) may establish the transmit path or the receive path by selectively connecting one of a power detector (e.g., the power detector 423-1 through 423-N) or an LNA (e.g., the LNA 421-1 through 421-N) with an antenna element (e.g., the antenna elements 410-1 through 410-N), and thus forward the transmit RF signal output from the LNA to the antenna element or forward the RF signal received from the antenna element to the power detector. The first Tx/Rx switch 429-1 may establish the transmit path or the receive path by selectively connecting one of the first power detector 423-1 or the first LNA 421-1 with the first antenna elements 410-1, and thus forward the transmit RF signal output from the first LNA 421-1 to the first antenna element 410-1 or forward the RF signal received from the first antenna element 410-1 to the first power detector 423-1.

According to an embodiment, the first type antenna circuitry 400 may include a 1:N divider/combiner 435 (hereafter, referred to as a 'divider/combiner 435' for the sake of explanations). The divider/combiner 435 may, for example, include various circuitry and divide one transmit signal to N-ary transmit signals, and combine N-ary receive signals to one receive signal.

The phase shifters 427-1 through 427-N may, for example, shift a phase of a corresponding transmit RF signal of the N-ary transmit RF signals output from the divider/combiner 435. For example, the first phase shifter 427-1 may shift the phase of the first transmit RF signal output from the divider/combiner 435 and apply it to the first PA 425-1. For example, the N-th phase shifter 427-N may shift the phase of the N-th transmit RF signal output from the divider/combiner 435 and apply it to the N-th PA 425-N.

The PAs 425-1 through 425-N may, for example, amplify and output power of the transmit RF signal fed from the phase shifter corresponding to at least one of the phase shifters 427-1 through 427-N. For example, the first PA 425-1 may amplify and output the power of the first transmit RF signal fed from the first phase shifter 427-1. For example, the N-th PA 425-N may amplify and output the power of the N-th transmit RF signal fed from the N-th phase shifter 427-N.

The transmit RF signal output by at least one of the PAs 425-1 through 425-N may be applied to at least one of the antenna elements 410-1 through 410-N of the antenna array 410.

At least one of the LNAs 421-1 through 421-N may, for example, low-noise amplify and output the receive RF signal fed from at least one of the N-ary antenna elements 410-1 through 410-N of the antenna array 410. The receive RF signal output by at least one of the LNAs 421-1 through 421-N may be applied to at least one of the phase shifters 427-1 through 427-N.

At least one of the phase shifters 427-1 through 427-N may shift the phase of at least one receive RF signal output from at least one of the LNAs 421-1 through 421-N, and apply the signal to the divider/combiner 435. The divider/combiner 435 may combine and output the receive signals fed from the phase shifters 427-1 through 427-N, as one receive signal to the mixer 431. The mixer 431 may mix the fed RF receive signal with the reference signal fed from the PLL 433, and thus output the down-converted IF signal.

Figure 5:
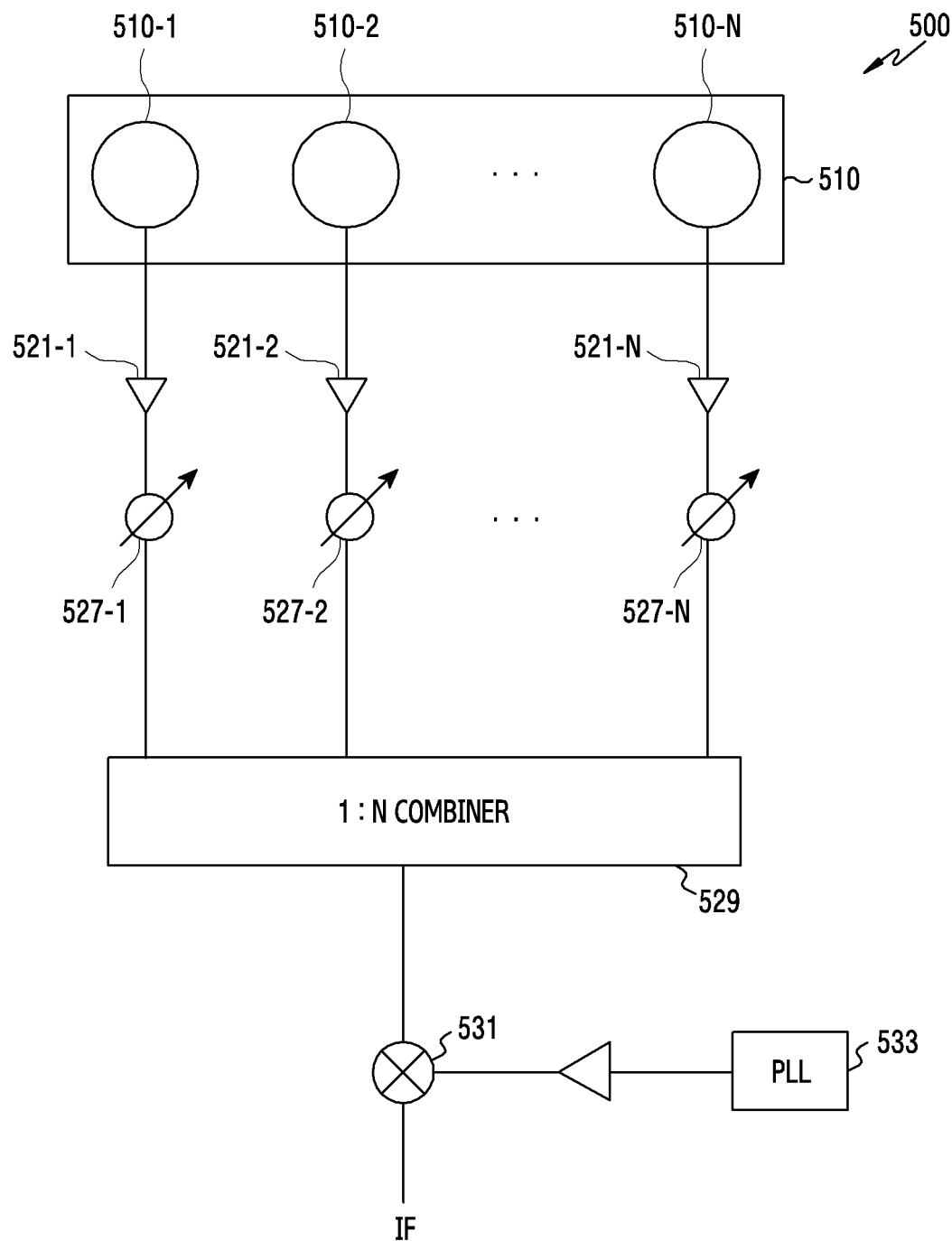
FIG. 5 is a diagram illustrating an example second type antenna circuitry in an electronic device according to various embodiments.

FIG. 5 is a diagram illustrating an example structure of a second type antenna circuitry 500 (e.g., the second type antenna circuitry 320 of FIG. 3) in an electronic device 101 according to various embodiments.

According to an embodiment, the second type antenna circuitry 500 may be implemented by way of non-limiting example as an independent circuitry by mounting components on one circuit board.

The second type antenna circuitry 500 may include, for example, an antenna array 510 including a plurality of antenna elements 510-1, 510-2 through 510-N, LNAs 521-1, 521-2 through 521-N, and/or phase shifters 527-1, 527-2 through 527-N. The antenna elements 510-1, 510-2 through 510-N may allow the signal reception.

According to various embodiments, the second type antenna circuitry 500 may operate for the reception, without the PAs 425-1 through 425-N for amplifying the transmit signal, the power detectors 423-1 through 423-N and/or the Tx/Rx switches 429-1 through 429-N, unlike the first type antenna circuitry 400 of FIG. 4.

According to an embodiment, the second type antenna circuitry 500 may include a 1:N combiner 529 (hereafter, referred to as a 'combiner 529' for the sake of explanations). The combiner 529 may, for example, include various circuitry and combine N-ary receive signals to one receive signal.

According to an embodiment, to receive a signal of the high frequency band (e.g., about 15 GHz-100 GHz) in the electronic device (e.g., the electronic device 101 of FIG. 1), the second type antenna circuitry 500 may include an RFIC (e.g., the third RFIC 226 of FIG. 2) including a mixer 531 and/or a PLL 533. For example, the second type antenna circuitry 500 may receive and convert an RF signal of about 15 GHz-100 GHz to an IF signal. The PLL 533 may generate a reference signal for the down-converting. The mixer 531 may mix the received RF signal with the reference signal and thus output the down-converted IF signal.

At least one of the LNAs 521-1 through 521-N may, for example, low-noise amplify and output the receive RF signal fed from at least one of the N-ary antenna elements 510-1 through 510-N of the antenna array 510. The receive RF signal output by at least one of the LNAs 521-1 through 521-N may be applied to at least one of the phase shifters 527-1 through 527-N.

At least one of the phase shifters 527-1 through 527-N may shift the phase of at least one receive RF signal output from at least one of the LNAs 521-1 through 521-N, and apply the signal to the combiner 529. The combiner 529 may combine and output the at least one receive signals fed from the phase shifters 527-1 through 527-N, as one receive signal to the mixer 531. The mixer 531 may mix the fed RF receive signal with the reference signal fed from the PLL 533, and thus output the down-converted IF signal.

According to an example embodiment, a portable communication device (e.g., the electronic device 101 of FIG. 1 or FIG. 2, or the portable communication device 300 of FIG. 3) may include: a processor (e.g., the processor 120 of FIG. 1 or FIG. 2, the processor 340 of FIG. 3), a communication circuit (e.g., the communication circuit 330 of FIG. 3), at least one first type antenna circuitry (e.g., the first type antenna circuitry 310 of FIG. 3) and at least one second type antenna circuitry (e.g., the second type antenna circuitry 320 of FIG. 3).

According to an example embodiment, the at least one first type antenna circuitry may include an antenna array configured to transmit and/or receive a signal, a power amplifier configured to amplify a transmit signal and a low noise amplifier configured to amplify a received signal, and the at least one second type antenna circuitry may include an antenna array (e.g., the antenna array 510 of FIG. 5) configured to receive a signal and a low noise amplifier (e.g., the LNAs 521-1 through 521-N of FIG. 5) configured to amplify a received signal, the at least one second type antenna circuitry not including a power amplifier (e.g., the PAs 425-1 through 425-N of FIG. 4) for amplifying a transmit signal.

According to an example embodiment, the processor may be configured to control the portable communication device to transmit a transmit signal through the at least one first type antenna circuitry, and to receive a receive signal through at least one selected from the at least one first type antenna circuitry and the at least one second type antenna circuitry.

According to an example embodiment, the at least one first type antenna circuitry may further include a divider and combiner (e.g., the divider/combiner 435 of FIG. 4) including circuitry configured to divide the transmit signal into a plurality of transmit signals and to combine a plurality of received signals to one receive signal.

According to an example embodiment, the at least one second type antenna circuitry may further include a combiner (e.g., the divider 529 of FIG. 5) including circuitry configured to combine a plurality of received signals to one receive signal.

According to an example embodiment, the at least one first type antenna circuitry and the at least one second type antenna circuitry may include an RFIC (e.g., the first, second, third, and fourth RFICs 222, 224, 226, and 228 of FIG. 2) configured to convert a radio frequency signal to an intermediate frequency signal.

According to an example embodiment, the at least one first type antenna circuitry may be positioned to form a beam toward a first surface of the portable communication device, and the at least one second type antenna circuitry may be positioned to form a beam toward a second surface different from the first surface of the portable communication device.

According to an example embodiment, with a plurality of the at least one first type antenna circuitries, the plurality of the first type antenna circuitries may face a plurality of different surfaces including a first surface and a second surface of the portable communication device, and the at least one second type antenna circuitry may be positioned to face a third surface of the portable communication device other than the first surface and the second surface.

According to an example embodiment, the processor may be configured to control the at least one antenna circuitry selected by searching for a transmit beam for the at least one first type antenna circuitry, as a transmit antenna circuitry, and to control the at least one antenna circuitry selected by searching for a receive beam for the at least one first type antenna circuitry and the at least one second type antenna circuitry, as a receive antenna circuitry.

According to an example embodiment, the processor may be configured to control the portable communication device to transmit a transmit signal through the at least one first type antenna circuitry, and to receive a receive signal through the at least one first type antenna circuitry and the at least one second type antenna circuitry.

According to an example embodiment, the processor may be configured to identify whether a level of the receive signal falls below a threshold level, search for a receive beam based on the level of the receive signal falling below the threshold, enable the at least one second type antenna circuitry to be additionally selected with the at least one first type antenna circuitry, and receive a receive signal through the enabled at least one second type antenna circuitry.

According to an example embodiment, the processor may be configured to determine whether optimal transmit and receive beams based on the transmit and receive beam searching are in the same antenna circuitry.

According to an example embodiment, based on the optimal beams based on the transmit and receive beam searching being in the same antenna circuitry, the processor may be configured to transmit and receive a signal through the at least one first type antenna circuitry.

According to an example embodiment, based on the optimal beams based on the transmit and receive beam searching not being in the same antenna circuitry, the processor may be configured to control the portable communication device to transmit a signal through the at least one first type antenna circuitry and to receive a signal through the at least one second type antenna circuitry.

Figure 6A:
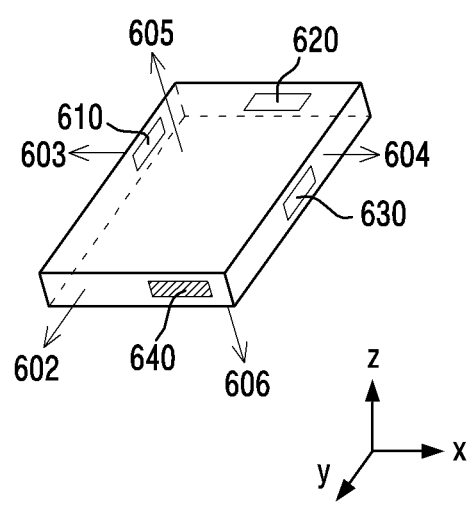
FIG. 6A is a diagram illustrating a deployment example of an antenna circuitry in an electronic device according to various embodiments.

FIG. 6A is a diagram illustrating a deployment example of an antenna circuitry in an electronic device according to various embodiments.

Figure 6B:
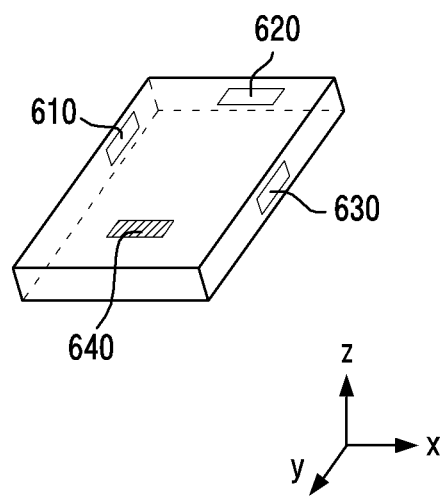
FIG. 6B is a diagram illustrating a deployment example of the antenna circuitry in the electronic device according to various embodiments.

FIG. 6B is a diagram illustrating a deployment example of the antenna circuitry in the electronic device according to various embodiments.

Figure 6C:
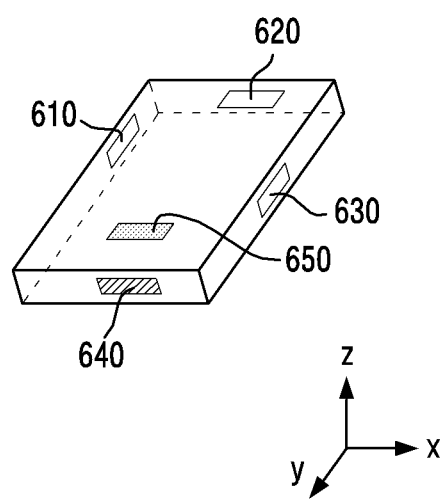
FIG. 6C is a diagram illustrating a deployment example of the antenna circuitry in the electronic device according to various embodiments.

FIG. 6C is a diagram illustrating a deployment example of the antenna circuitry in the electronic device according to various embodiments.

Figure 6D:
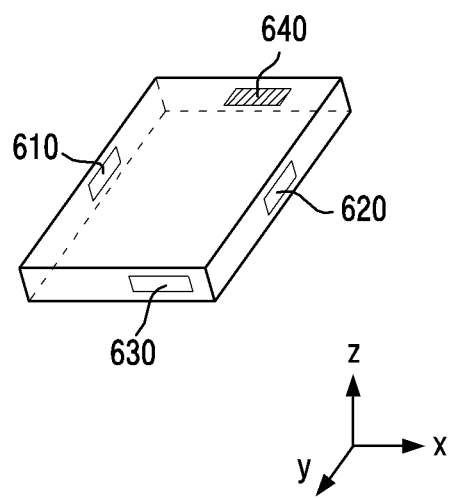
FIG. 6D is a diagram illustrating a deployment example of the antenna circuitry in the electronic device according to various embodiments.

FIG. 6D is a diagram illustrating a deployment example of the antenna circuitry in the electronic device according to various embodiments.

Figure 6E:
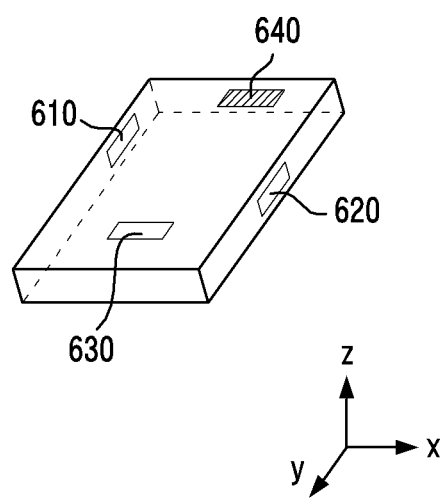
FIG. 6E is a diagram illustrating a deployment example of the antenna circuitry in the electronic device according to various embodiments.

FIG. 6E is a diagram illustrating a deployment example of the antenna circuitry in the electronic device according to various embodiments.

Figure 6F:
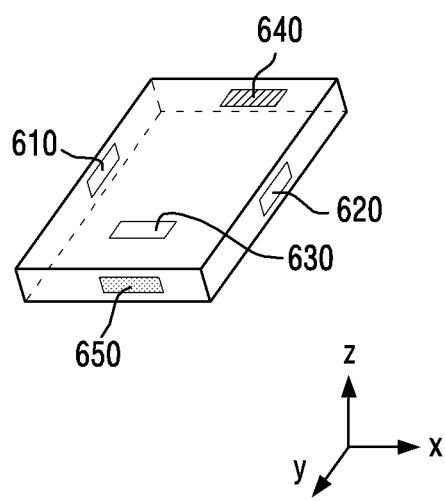
FIG. 6F is a diagram illustrating a deployment example of the antenna circuitry in the electronic device according to various embodiments.

FIG. 6F is a diagram illustrating a deployment example of the antenna circuitry in the electronic device according to various embodiments.

Figure 6G:
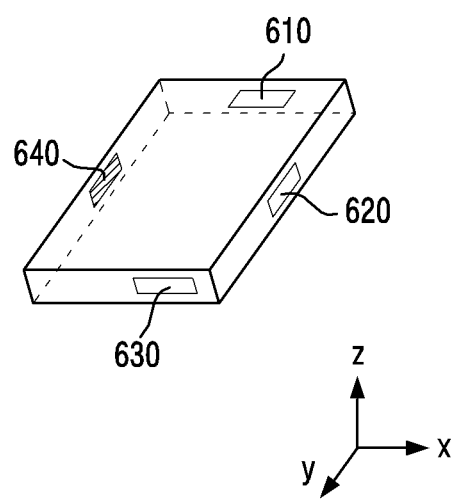
FIG. 6G is a diagram illustrating a deployment example of the antenna circuitry in the electronic device according to various embodiments.

FIG. 6G is a diagram illustrating a deployment example of the antenna circuitry in the electronic device according to various embodiments.

Figure 6H:
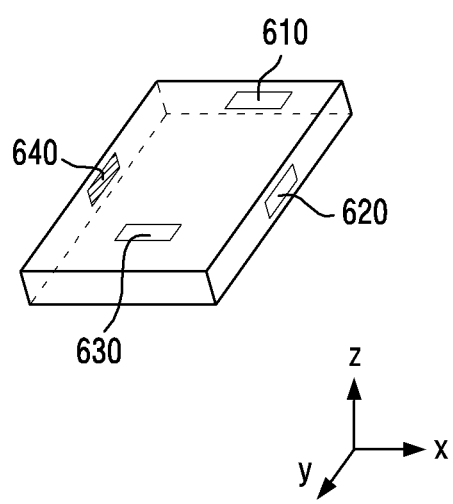
FIG. 6H is a diagram illustrating a deployment example of the antenna circuitry in the electronic device according to various embodiments.

FIG. 6H is a diagram illustrating a deployment example of the antenna circuitry in the electronic device according to various embodiments.

Figure 6I:
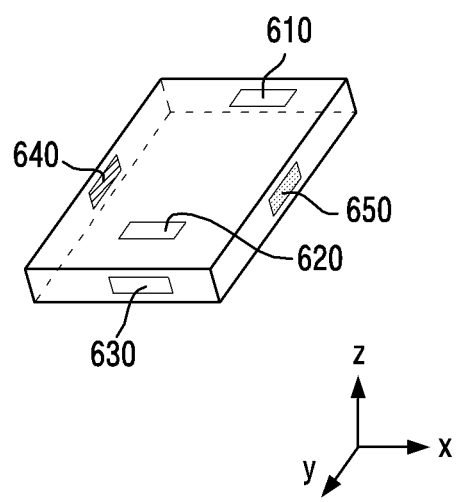
FIG. 6I is a diagram illustrating a deployment example of the antenna circuitry in the electronic device according to various embodiments.

FIG. 6I is a diagram illustrating a deployment example of the antenna circuitry in the electronic device according to various embodiments.

Figure 6J:
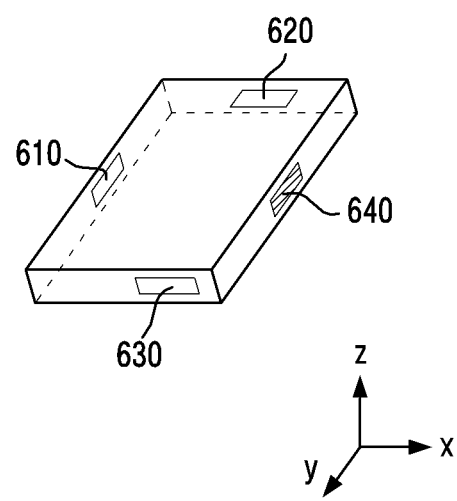
FIG. 6J is a diagram illustrating a deployment example of the antenna circuitry in the electronic device according to various embodiments.

FIG. 6J is a diagram illustrating a deployment example of the antenna circuitry in the electronic device according to various embodiments.

Figure 6K:
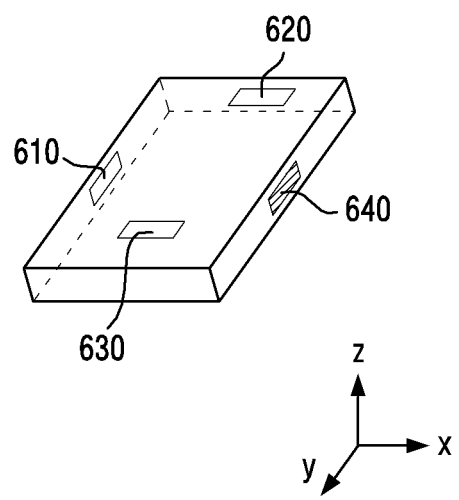
FIG. 6K is a diagram illustrating a deployment example of the antenna circuitry in the electronic device according to various embodiments.

FIG. 6K is a diagram illustrating a deployment example of the antenna circuitry in the electronic device according to various embodiments.

Figure 6L:
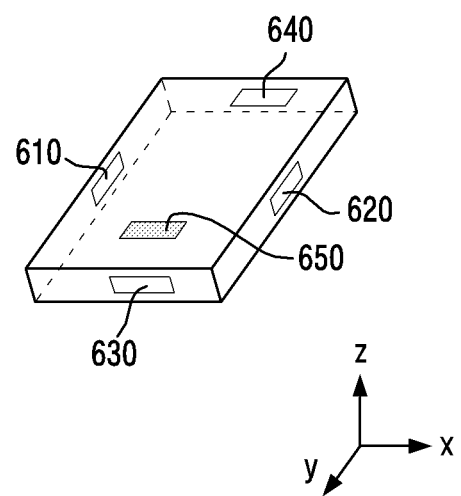
FIG. 6L is a diagram illustrating a deployment example of the antenna circuitry in the electronic device according to various embodiments.

FIG. 6L is a diagram illustrating a deployment example of the antenna circuitry in the electronic device according to various embodiments.

According to an embodiment, a first antenna circuitry 610, a second antenna circuitry 620, a third antenna circuitry 630, a fourth antenna circuitry 640, or a fifth antenna circuitry 650 may be the first type antenna circuitry 310 or the second type antenna circuitry 320 of FIG. 3. For example, and without limitation, the first antenna circuitry 610, the second antenna circuitry 620 and the third antenna circuitry 630 may be the first type antenna circuitry 310 of FIG. 3, and the fourth antenna circuitry 640 and the fifth antenna circuitry 650 may be the second type antenna circuitry 320.

The number of the first antenna circuitries and the number of the second type antenna circuitries according to an embodiment are merely examples, the embodiments of the disclosure are not limited thereto, and the first type antenna circuitries of various numbers and the second type antenna circuitries of various numbers may be employed.

Referring to FIG. 6A, for example, the first antenna circuitry 610 may be disposed close to a third side 603 (e.g., a left side), to form or steer a beam toward the −x axis direction. For example, the second antenna circuitry 620 may be disposed close to a first side 605 (e.g., a front side), to form or steer a beam toward the +z axis direction. The third antenna circuitry 630 may be disposed close to a fourth side 604 (e.g., a right side), to form or steer a beam toward the +x axis direction. The fourth antenna circuitry 640 may be disposed close to a second side 602 (e.g., a bottom side), to form or steer a beam toward the +y axis direction.

Referring to FIG. 6B, for example, the first antenna circuitry 610 may be disposed close to the third side 603 (e.g., a left side), to form or steer a beam toward the −x axis direction. For example, the second antenna circuitry 620 may be disposed close to the first side 605 (e.g., a front side), to form or steer a beam toward the +z axis direction. The third antenna circuitry 630 may be disposed close to the fourth side 604 (e.g., a right side), to form or steer a beam toward the +x axis direction. The fourth antenna circuitry 640 may be disposed close to a second side 606 (e.g., a back side), to form or steer a beam toward the −z axis direction.

Referring to FIG. 6C, for example, the first antenna circuitry 610 may be disposed close to the third side 603 (e.g., a left side), to form or steer a beam toward the −x axis direction. For example, the second antenna circuitry 620 may be disposed close to the first side 605 (e.g., a front side), to form or steer a beam toward the +z axis direction. The third antenna circuitry 630 may be disposed close to the fourth side 604 (e.g., a right side), to form or steer a beam toward the +x axis direction. The fourth antenna circuitry 640 may be disposed close to the second side 602 (e.g., a bottom side), to form or steer a beam toward the +y axis direction. The fifth antenna circuitry 650 may be disposed close to the second side 606 (e.g., a back side), to form or steer a beam toward the −z axis direction.

Referring to FIG. 6D, for example, the first antenna circuitry 610 may be disposed close to the third side 603 (e.g., a left side), to form or steer a beam toward the −x axis direction. For example, the second antenna circuitry 620 may be disposed close to the fourth side 604 (e.g., a right side), to form or steer a beam toward the +x axis direction. The third antenna circuitry 630 may be disposed close to the second side 602 (e.g., a bottom side), to form or steer a beam toward the +y axis direction. The fourth antenna circuitry 640 may be disposed close to the first side 605 (e.g., a front side), to form or steer a beam toward the +z axis direction.

Referring to FIG. 6E, for example, the first antenna circuitry 610 may be disposed close to the third side 603 (e.g., a left side), to form or steer a beam toward the −x axis direction. For example, the second antenna circuitry 620 may be disposed close to the fourth side 604 (e.g., a right side), to form or steer a beam toward the +x axis direction. The third antenna circuitry 630 may be disposed close to the second side 606 (e.g., a back side), to form or steer a beam toward the −z axis direction. The fourth antenna circuitry 640 may be disposed close to the first side 605 (e.g., a front side), to form or steer a beam toward the +z axis direction.

Referring to FIG. 6F, for example, the first antenna circuitry 610 may be disposed close to the third side 603 (e.g., a left side), to form or steer a beam toward the −x axis direction. For example, the second antenna circuitry 620 may be disposed close to the fourth side 604 (e.g., a right side), to form or steer a beam toward the +x axis direction. The third antenna circuitry 630 may be disposed close to the second side 606 (e.g., a back side), to form or steer a beam toward the −z axis direction. The fourth antenna circuitry 640 may be disposed close to the first side 605 (e.g., a front side), to form or steer a beam toward the +z axis direction. The fifth antenna circuitry 650 may be disposed close to the second side 602 (e.g., a bottom side), to form or steer a beam toward the +y axis direction.

Referring to FIG. 6G, for example, the first antenna circuitry 610 may be disposed close to the first side 605 (e.g., a front side), to form or steer a beam toward the +z axis direction. For example, the second antenna circuitry 620 may be disposed close to the fourth side 604 (e.g., a right side), to form or steer a beam toward the +x axis direction. The third antenna circuitry 630 may be disposed close to the second side 602 (e.g., a bottom side), to form or steer a beam toward the +y axis direction. The fourth antenna circuitry 640 may be disposed close to the third side 603 (e.g., a left side), to form or steer a beam toward the −x axis direction.

Referring to FIG. 6H, for example, the first antenna circuitry 610 may be disposed close to the first side 605 (e.g., a front side), to form or steer a beam toward the +z axis direction. The second antenna circuitry 620 may be disposed close to the fourth side 604 (e.g., a right side), to form or steer a beam toward the +x axis direction. The third antenna circuitry 630 may be disposed close to the second side 606 (e.g., a back side), to form or steer a beam toward the −z axis direction. The fourth antenna circuitry 640 may be disposed close to the third side 603 (e.g., a left side), to form or steer a beam toward the −x axis direction.

Referring to FIG. 6I, for example, the first antenna circuitry 610 may be disposed close to the first side 605 (e.g., a front side), to form or steer a beam toward the +z axis direction. The second antenna circuitry 620 may be disposed close to the second side 606 (e.g., a back side), to form or steer a beam toward the −z axis direction. The third antenna circuitry 630 may be disposed close to the second side 602 (e.g., a bottom side), to form or steer a beam toward the +y axis direction. The fourth antenna circuitry 640 may be disposed close to the third side 603 (e.g., a left side), to form or steer a beam toward the −x axis direction. The fifth antenna circuitry 650 may be disposed close to the fourth side 604 (e.g., a right side), to form or steer a beam toward the +x axis direction.

Referring to FIG. 6J, for example, the first antenna circuitry 610 may be disposed close to the third side 603 (e.g., a left side), to form or steer a beam toward the −x axis direction. The second antenna circuitry 620 may be disposed close to the first side 605 (e.g., a front side), to form or steer a beam toward the +z axis direction. The third antenna circuitry 630 may be disposed close to the second side 602 (e.g., a bottom side), to form or steer a beam toward the +y axis direction. The fourth antenna circuitry 640 may be disposed close to the fourth side 604 (e.g., a right side), to form or steer a beam toward the +x axis direction.

Referring to FIG. 6K, for example, the first antenna circuitry 610 may be disposed close to the third side 603 (e.g., a left side), to form or steer a beam toward the −x axis direction. The second antenna circuitry 620 may be disposed close to the first side 605 (e.g., a front side), to form or steer a beam toward the +z axis direction. The third antenna circuitry 630 may be disposed close to the second side 606 (e.g., a back side), to form or steer a beam toward the −z axis direction. The fourth antenna circuitry 640 may be disposed close to the fourth side 604 (e.g., a right side), to form or steer a beam toward the +x axis direction.

Referring to FIG. 6L, for example, the first antenna circuitry 610 may be disposed close to the first third 603 (e.g., a left side), to form or steer a beam toward the −x axis direction. The second antenna circuitry 620 may be disposed close to the fourth side 604 (e.g., a right side), to form or steer a beam toward the +x axis direction. The third antenna circuitry 630 may be disposed close to the second side 602 (e.g., a bottom side), to form or steer a beam toward the +y axis direction. The fourth antenna circuitry 640 may be disposed close to the first side 605 (e.g., a front side), to form or steer a beam toward the +z axis direction. The fifth antenna circuitry 650 may be disposed close to the second side 606 (e.g., a back side), to form or steer a beam toward the −z axis direction.

Figure 7:
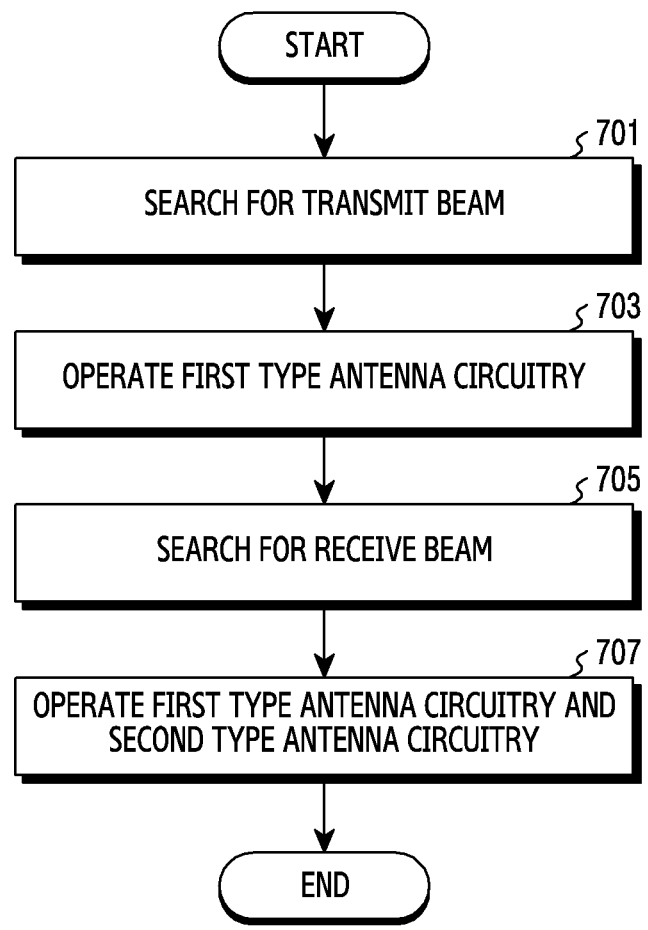
FIG. 7 is a flowchart illustrating example operations of an electronic device including a first type antenna circuitry and a second type antenna circuitry according to various embodiments.

FIG. 7 is a flowchart illustrating example operations of an electronic device (e.g., the electronic device 101 of FIG. 1) including a first type antenna circuitry and a second type antenna circuitry according to various embodiments.

According to various embodiments, in operation 701, the electronic device may search for a transmit beam for the signal transmission under control of a processor (e.g., the processor 340 of FIG. 3) for the communication over the network. The processor may search for the transmit beam by, for example, operating every available first type antenna circuitry (e.g., the first type antenna circuitry 310 or 400 of FIG. 3 or FIG. 4) of the electronic device.

According to various embodiments, in operation 703, the processor may operate at least one of every available first type antenna circuitry (e.g., the first type antenna circuitry 310 or 400 of FIG. 3 or FIG. 4) of the electronic device, as a Tx antenna circuitry according to the transmit beam search result.

According to various embodiments, in operation 705, the processor may perform receive beam searching for the communication over the network. The processor may search for a receive beam by, for example, operating every available second type antenna circuitry (e.g., the second type antenna circuitry 320 or 500 of FIG. 3 or FIG. 4) of the electronic device.

According to various embodiments, in operation 707, the processor may control the electronic device to operate at least one second type antenna circuitry selected according to the receive beam search result, as a Rx antenna circuitry, and operate the at least one first type antenna circuitry selected in operation 703 as a Tx or Rx antenna circuitry.

According to various embodiments, the electronic device may access the network by completing radio resource control (RRC) connection establishment and registration, connect the network, search for the transmit beam and the receive beam, operate the at least one first type antenna circuitry in the transmission, and operate the at least one second type antenna circuitry in the reception.

According to an embodiment, after being turned on, the electronic device may detect a downlink (DL) signal radiated by a base station (BS) using the high frequency band (e.g., mmWave), and the electronic device may quickly access the BS by operating every available first type antenna circuitry and second type antenna circuitry because it is very important to shorten the time till the registration to the BS.

Figure 8:
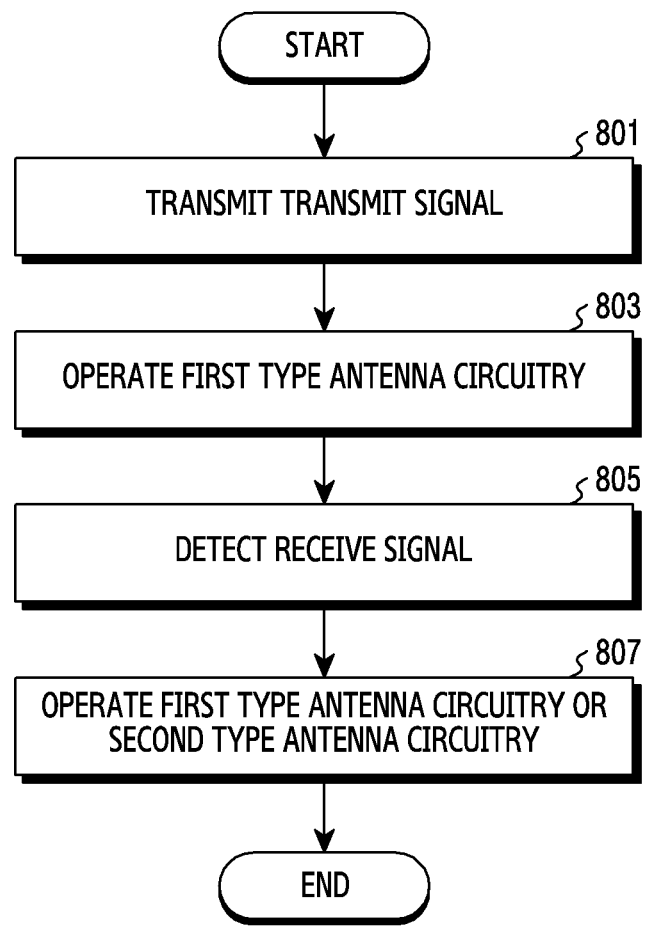
FIG. 8 is a flowchart illustrating example operations of an electronic device including a first type antenna circuitry and a second type antenna circuitry according to various embodiments.

FIG. 8 is a flowchart illustrating example operations of an electronic device (e.g., the electronic device 101 of FIG. 1) including a first type antenna circuitry and a second type antenna circuitry according to various embodiments.

According to various embodiments, the electronic device may transmit or receive a signal over a network under control of a processor (e.g., the processor 340 of FIG. 3).

According to various embodiments, in operation 801, to transmit the signal over the network, the processor may transmit the transmit signal to a communication circuit (e.g., the communication circuit 330 of FIG. 3). Hence, the communication circuit may process and output the transmit signal.

According to various embodiments, in operation 803, the processor may control the electronic device to operate at least one first type antenna circuitry (e.g., the first type antenna circuitry 310 or 400 of FIG. 3 or FIG. 4), and control the electronic device to transmit the transmit signal through the at least one first type antenna circuitry. For example, the processor may control the electronic device to transmit the transmit signal by operating the first type antenna circuitries of a designated number according to variables such as a signal output of the at least one first type antenna circuitry, a transmit signal quality, characteristics of the transmit signal, and network propagation conditions. For example, the processor may perform the transmit beam searching on a periodic basis and selectively operate the at least one first type antenna circuitry.

According to various embodiments, in operation 805, the processor may detect a receive signal transmitted over the network. For example, the processor may detect the receive signal through the at least one first type antenna circuitry currently operating or another first type antenna circuitry.

According to various embodiments, in operation 807, the processor may operate the at least one first type antenna circuitry or at least one second type antenna circuitry (e.g., the second type antenna circuitry 320 or 500 of FIG. 3 or FIG. 5). For example, the processor may receive a receive signal through at least one separate second type antenna circuitry, in addition to or in place of the at least one first type antenna circuitry. For example, the processor may control second type antenna circuitries of a designated number to receive the receive signal in addition to or in place of the at least one first type antenna circuitry, according to the variables such as a receive signal quality such as a signal to noise ratio (SNR) value of the signal received via the at least one second type antenna circuitry, and network propagation conditions. For example, the processor may perform receive beam searching using the at least one first type antenna circuitry or the at least one second type antenna circuitry on a periodic basis and thus selectively operate at least one second type antenna circuitry for the receive signal reception.

Figure 9:
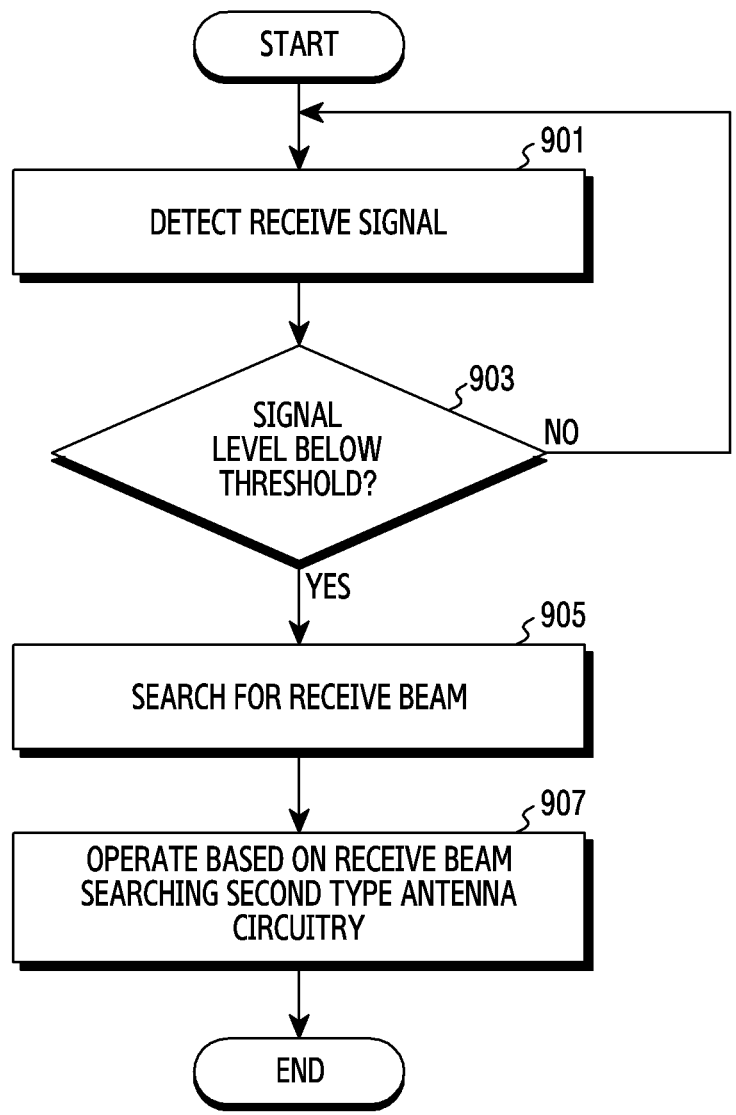
FIG. 9 is a flowchart illustrating example operations of an electronic device including a first type antenna circuitry and a second type antenna circuitry according to various embodiments.

FIG. 9 is a flowchart illustrating example operations of an electronic device (e.g., the electronic device 101 of FIG. 1) including a first type antenna circuitry and a second type antenna circuitry according to various embodiments.

According to various embodiments, the electronic device may transmit or receive a signal over a network under control of a processor (e.g., the processor 340 of FIG. 3).

According to various embodiments, in operation 901, the processor may detect a receive signal received over the network. For example, the processor may detect the receive signal through at least one first type antenna circuitry (e.g., the first type antenna circuitry 310 or 400 of FIG. 3 or FIG. 4) currently operating.

According to various embodiments, in operation 903, the processor may measure a level (SNR) of the received signal and determine whether the signal level is below a designated threshold. For example, the processor may monitor the SNR of the receive signal to select the number or positions of second type antenna circuitries to enable based on the SNR value of the receive signal.

According to various embodiments, if the level of the receive signal is below the designated threshold ("Yes" in operation 903), the processor may perform the receive beam searching using at least one second type antenna circuitry (e.g., the second type antenna circuitry 320 or 500 of FIG. 3 or FIG. 5), in operation 905.

According to various embodiments, in operation 907, the processor may control the electronic device to receive the received signal by operating the at least one second type antenna circuitry selected according to the receive beam searching.

Figure 10A:
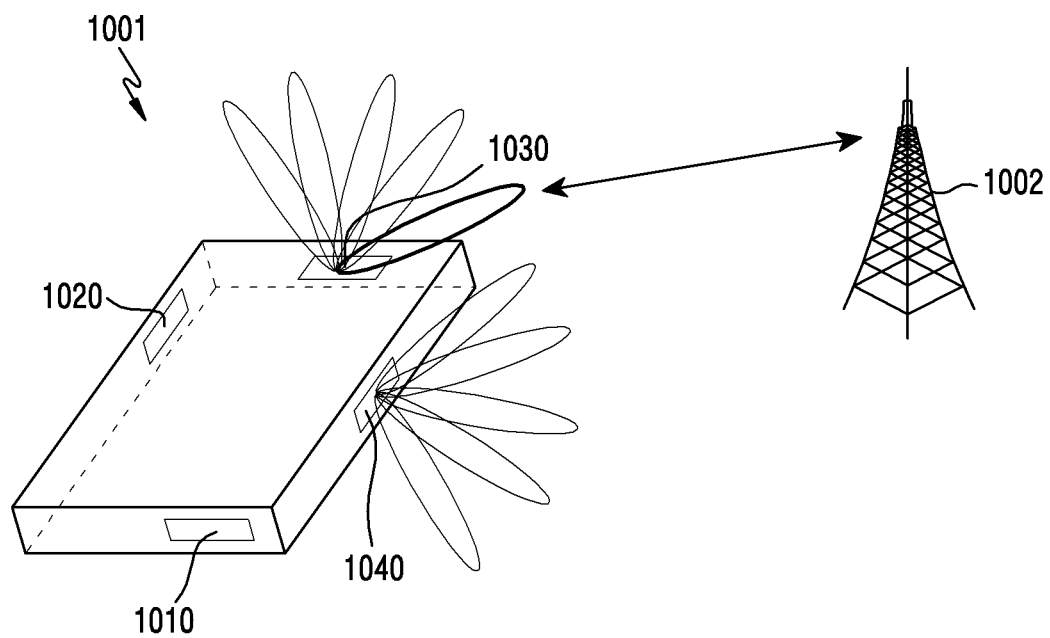
FIG. 10A is a diagram illustrating various example operations of an electronic device including a first type antenna circuitry and a second type antenna circuitry according to various embodiments.

FIG. 10A is a diagram illustrating example operations of an electronic device including a first type antenna circuitry and a second type antenna circuitry according to various embodiments.

Figure 10B:
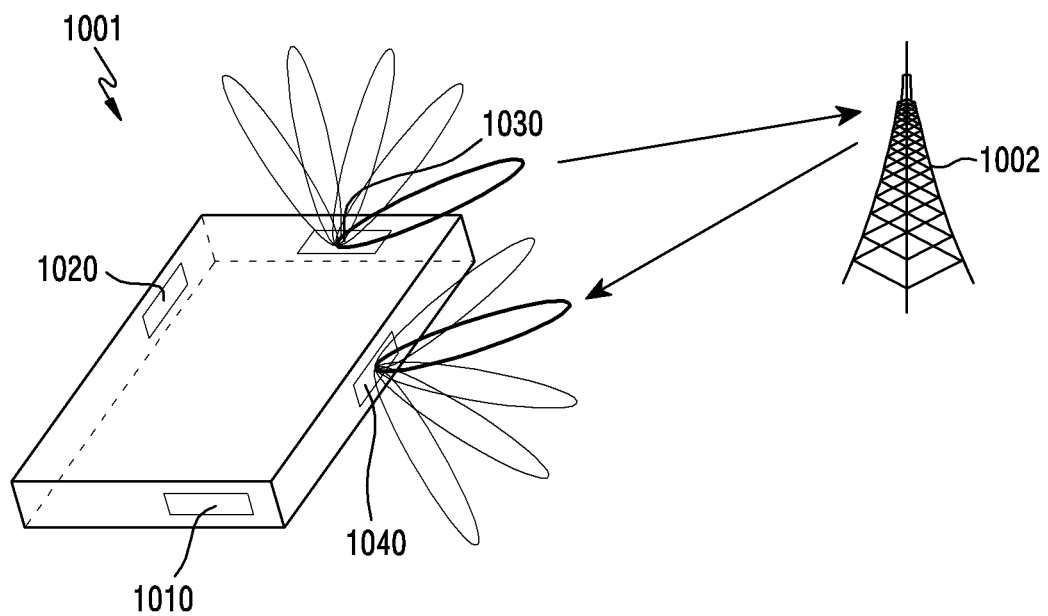
FIG. 10B is a diagram illustrating example operations of the electronic device including the first type antenna circuitry and the second type antenna circuitry according to various embodiments.

FIG. 10B is a diagram illustrating example operations of the electronic device including the first type antenna circuitry and the second type antenna circuitry according to various embodiments Referring to FIG. 10A and FIG. 10B, an electronic device 1001 may include the electronic device 101 of FIG. 1, and may transmit and receive a signal to and from a BS 1002 over a network.

According to an embodiment, the electronic device 1001 may include a first antenna circuitry 1010, a second antenna circuitry 1020, a third antenna circuitry 1030 and/or a fourth antenna circuitry 1040. For example, the first antenna circuitry 1010, the second antenna circuitry 1020, and the third antenna circuitry 1030 may be implemented with the first type antenna circuitry 310 of FIG. 3, and the fourth antenna circuitry 1040 may be implemented with the second type antenna circuitry 320.

According to an embodiment, if receiving a signal from a BS 1002, the electronic device 1001 may use, for example, both of the third antenna circuitry 1030 and the fourth antenna circuitry 1040. For example, the electronic device 1001 may transmit a signal to the BS 1002 using the third antenna circuitry 1030. For example, the fourth antenna circuitry 1040 may not be used to transmit a signal to the BS 1002.

According to an embodiment, referring to FIG. 10A, the electronic device 1001 may search for a transmit beam by operating the third antenna circuitry 1030, and may search for a receive beam by operating the third antenna circuitry 1030 and the fourth antenna circuitry 1040.

For example, a beam of a bold line in the third antenna circuitry 1030 of FIG. 10A may be searched as an optimal transmit beam and receive beam. For example, the electronic device 1001 may search for the transmit beam and the receive beam used for the transmission and the reception with the BS 1002 in the same antenna circuitry, and thus use the same antenna circuitry in the transmission and the reception.

For example, a beam of a bold line in the third antenna circuitry 1030 of FIG. 10B may be searched as an optimal transmit beam, and a beam of a bold line in the fourth antenna circuitry 1040 may be searched as an optimal receive beam. For example, the electronic device 1001 may search for the transmit beam and the receive beam used for the transmission and the reception with the BS 1002 in the different antenna circuitries, and thus use the different antenna circuitries in the transmission and the reception.

Figure 11:
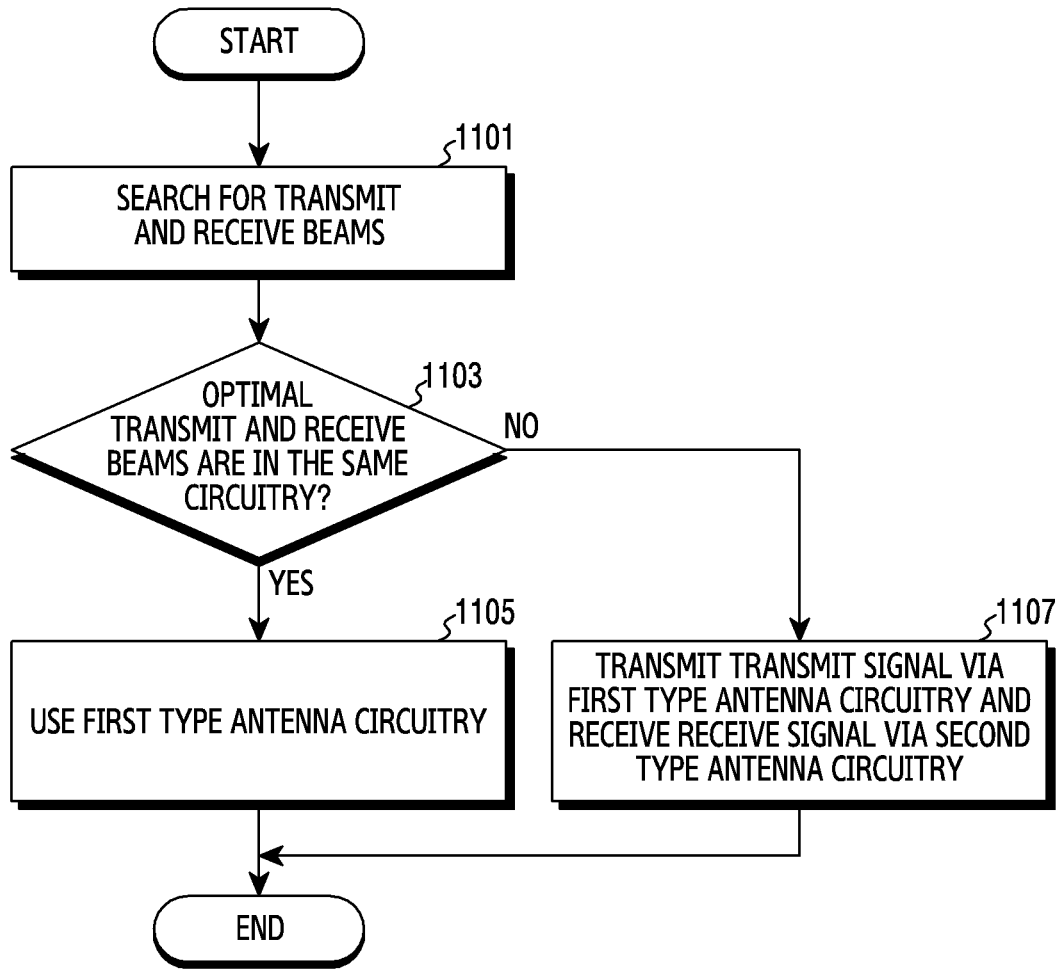
FIG. 11 is a flowchart illustrating example operations of an electronic device including a first type antenna circuitry and a second type antenna circuitry according to various embodiments.

FIG. 11 is a flowchart illustrating example operations of an electronic device (e.g., the electronic device 101 of FIG. 1) including a first type antenna circuitry and a second type antenna circuitry according to various embodiments.

According to various embodiments, in operation 1101, the electronic device may search for transmit and receive beams for signal transmission and reception under control of a processor (e.g., the processor 340 of FIG. 3) for communication over a network. For example, the processor may search for the transmit beam using every available first type antenna circuitry (e.g., the first type antenna circuitry 310 or 400 of FIG. 3 or FIG. 4) in the electronic device, and may search for the receive beam by operating every available first type antenna circuitry and second type antenna circuitry (e.g., the second type antenna circuitry 320 or 500 of FIG. 3 or FIG. 4).

According to various embodiments, in operation 1103, the processor may determine whether optimal transmit and receive beams according to the transmit and receive beam searching results are the same first type antenna circuitry.

According to various embodiments, if the optimal transmit and receive beams are the same first type antenna circuitry ("Yes" in operation 1103), the processor may operate at least one first type antenna circuitry selected accordingly, in operation 1105.

According to various embodiments, if the optimal transmit and receive beams are not the same first type antenna circuitry ("No" in operation 1103), the processor may transmit a transmit signal by operating at least one first type antenna circuitry selected for the transmission, and receive a receive signal by operating at least one second type antenna circuitry selected for the reception, in operation 1107.

Various embodiments of the disclosure provide a structure which employs one or more reception only antenna circuitries in addition to the transmit and receive antenna circuitry, and thus the size of the antenna circuitry may be reduced and spatial efficiency may be achieved.

Various embodiments of the disclosure may prevent and/or reduce abrupt electric field deterioration or communication link disconnection, by utilizing one or more additional receive only antenna circuitries, and improve terminal reception performance.

According to various embodiments of the disclosure, an electronic device including an antenna circuitry reduced in volume, may reduce a space for mounting the antenna circuitry.

According to various embodiments of the disclosure, an electronic device may improve terminal reception performance by adopting an additional receive antenna circuitry.

According to various embodiments of the disclosure, an electronic device may improve reception performance using a plurality of antenna circuitries even if an electric field is deteriorated due to directivity of transmission and reception propagation.

The electronic device according to various embodiments may, for example, be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A portable communication device comprising:
a processor;
a communication circuit;
at least one first type antenna circuitry; and
at least one second type antenna circuitry,
wherein the at least one first type antenna circuitry comprises an antenna array configured to transmit and/or receive a signal, a power amplifier configured to amplify a transmit signal and a low noise amplifier configured to amplify a received signal,
the at least one second type antenna circuitry comprises an antenna array configured to receive a signal and a low noise amplifier configured to amplify a received signal, the at least one second type antenna circuitry not including a power amplifier configured to amplify a transmit signal,
the processor configured to control the portable communication device to transmit a transmit signal through the at least one first type antenna circuitry, and to receive a receive signal through at least one selected from the at least one first type antenna circuitry and the at least one second type antenna circuitry,
at least one first type antenna circuitry further comprises a divider and combiner comprising circuitry configured to divide the transmit signal to a plurality of transmit signals and to combine a plurality of received signals to one receive signal, and
the at least one second type antenna circuitry further comprises a combiner comprising circuitry configured to combine a plurality of received signals to one receive signal.

2. The portable communication device of claim 1, wherein the processor is configured to determine whether optimal transmit and receive beams based on the transmit and receive beam searching are in the same antenna circuitry.

3. The portable communication device of claim 1, wherein the at least one first type antenna circuitry and the at least one second type antenna circuitry comprise a radio frequency integrated circuit (RFIC) configured to convert a radio frequency signal to an intermediate frequency signal.

4. The portable communication device of claim 1, wherein the at least one first type antenna circuitry is positioned to form a beam toward a first surface of the portable communication device, and
the at least one second type antenna circuitry is positioned to form a beam toward a second surface of the portable communication device different from the first surface.

5. The portable communication device of claim 1, comprising a plurality of the at least one first type antenna circuitries, the plurality of the antenna circuitries each facing a different surface including a first surface and a second surface of the portable communication device, and
the at least one second type antenna circuitry is positioned to face a third surface of the portable communication device different from the first surface and the second surface.

6. The portable communication device of claim 1, wherein the processor is configured to operate at least one antenna circuitry selected by searching for a transmit beam for the at least one first type antenna circuitry as a transmit antenna circuitry, and to operate at least one antenna circuitry selected by searching for a receive beam for the at least one first type antenna circuitry and the at least one second type antenna circuitry as a receive antenna circuitry.

7. The portable communication device of claim 1, wherein the processor is configured to control the portable communication device to transmit a transmit signal through the at least one first type antenna circuitry, and to receive a receive signal through the at least one first type antenna circuitry and the at least one second type antenna circuitry.

8. The portable communication device of claim 1, wherein the processor is configured to identify whether a level of the receive signal falls below a threshold, to search for a receive beam based on the level of the receive signal falling below the threshold, to enable the at least one second type antenna circuitry additionally selected with the at least one first type antenna circuitry, and to receive a receive signal through the enabled at least one second type antenna circuitry.

9. A portable communication device comprising:
a processor;
a communication circuit;
at least one first type antenna circuitry; and
at least one second type antenna circuitry,
wherein the at least one first type antenna circuitry comprises an antenna array configured to transmit and/or receive a signal, a power amplifier configured to amplify a transmit signal and a low noise amplifier configured to amplify a received signal,
the at least one second type antenna circuitry comprises an antenna array configured to receive a signal and a low noise amplifier configured to amplify a received signal, the at least one second type antenna circuitry not including a power amplifier configured to amplify a transmit signal,
the processor configured to control the portable communication device to transmit a transmit signal through the at least one first type antenna circuitry, and to receive a receive signal through at least one selected from the at least one first type antenna circuitry and the at least one second type antenna circuitry, and
the processor is configured to determine whether optimal transmit and receive beams based on the transmit and receive beam searching are in the same antenna circuitry.

10. The portable communication device of claim 9, wherein, based on the optimal beams based on the transmit and receive beam searching being in the same antenna circuitry, the processor is configured to control the portable communication device to transmit and receive a signal through the at least one first type antenna circuitry.

11. The portable communication device of claim 9, wherein, based on the optimal beams based on the transmit and receive beam searching not being in the same antenna circuitry, the processor is configured to control the portable communication device to transmit a signal through the at least one first type antenna circuitry and to receive a signal through the at least one second type antenna circuitry.

12. A method of controlling a portable communication device which comprises at least one first type antenna circuitry and at least one second type antenna circuitry, the at least one first type antenna circuitry comprising an antenna array configured to transmit and/or receive a signal, a power amplifier configured to amplify a transmit signal and a low noise amplifier configured to amplify a received signal, the at least one second type antenna circuitry comprising an antenna array configured to receive a signal and a low noise amplifier to amplify a received signal, the at least one second type antenna circuitry not including a power amplifier configured to amplify a transmit signal, the method comprising:
transmitting a transmit signal through the at least one first type antenna circuitry;
receiving a receive signal through at least one selected from the at least one first type antenna circuitry and the at least one second type antenna circuitry; and
searching for the transmit and receive beams and determining whether optimal transmit and receive beams are in a same antenna circuitry.

13. The method of claim 12, further comprising:
searching for a transmit beam for the at least one first type antenna circuitry; and
transmitting a transmit signal by operating the at least one first type antenna circuitry selected based on the transmit beam searching, as a transmit antenna circuitry.

14. The method of claim 12, further comprising:
searching for a receive beam for the at least one first type antenna circuitry and the at least one second type antenna circuitry; and
receiving a receive signal by operating at least one antenna circuitry selected based on the receive beam searching, as a receive antenna circuitry.

15. The method of claim 12, wherein the receiving receives the receive signal through the at least one second type antenna circuitry and the at least one first type antenna circuitry.

16. The method of claim 15, further comprising:
based on a level of the receive signal falling below a threshold, performing receive beam searching for the at least one second type antenna circuitry.

17. The method of claim 16, wherein the searching for the beam receives the receive signal through one selected from the at least one first type antenna circuitry and the at least one second type antenna circuitry based on the receive beam searching.

18. The method of claim 12, further comprising:
based on the optimal beams based on the transmit and receive beam searching being in the same antenna circuitry, transmitting and receiving a signal through the at least one first type antenna circuitry; and
based on the optimal beams based on the transmit and receive beam searching not being in the same antenna circuitry, transmitting a signal through the at least one first type antenna circuitry and receiving a signal through the at least one second type antenna circuitry.

19. A portable communication device comprising:
a processor;
a communication circuit;
at least one first type antenna circuitry; and
at least one second type antenna circuitry,
wherein the at least one first type antenna circuitry comprises an antenna array configured to transmit and/or receive a signal, a power amplifier configured to amplify a transmit signal and a low noise amplifier configured to amplify a received signal,
the at least one second type antenna circuitry comprises an antenna array configured to receive a signal and a low noise amplifier configured to amplify a received signal, the at least one second type antenna circuitry not including a power amplifier for amplifying a transmit signal,
the processor is configured to control the portable communication device to transmit a transmit signal through the at least one first type antenna circuitry, and, based on a level of a receive signal received through the first type antenna circuitry falling below a threshold, to receive a receive signal through the at least one first type antenna circuitry and the at least one second type antenna circuitry by searching for a receive beam,
at least one first type antenna circuitry further comprises a divider and combiner comprising circuitry configured to divide the transmit signal to a plurality of transmit signals and to combine a plurality of received signals to one receive signal, and
the at least one second type antenna circuitry further comprises a combiner comprising circuitry configured to combine a plurality of received signals to one receive signal.

20. The portable communication device of claim 19, wherein, the processor is configured to determine whether optimal transmit and receive beams based on the transmit and receive beam searching are in the same antenna circuitry.

* * * * *